Feb. 16, 1954
C. L. LOKKEN
2,669,172
ONE-WAY DISK TILLER HITCH
Filed Dec. 30, 1949
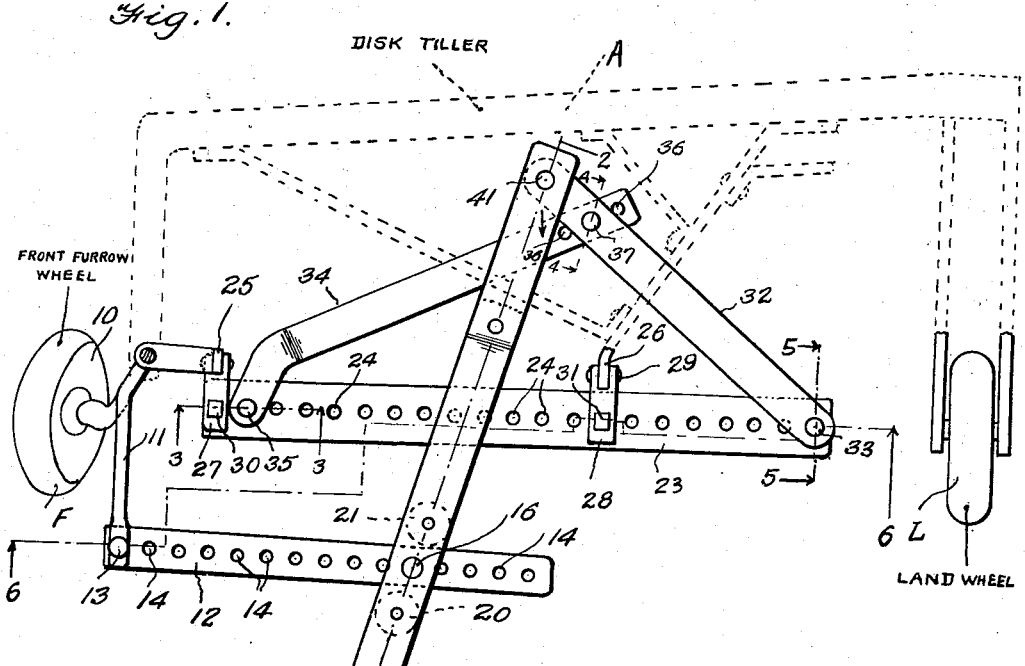
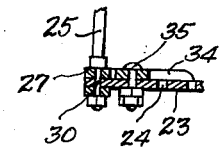
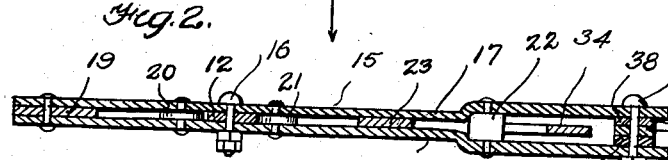
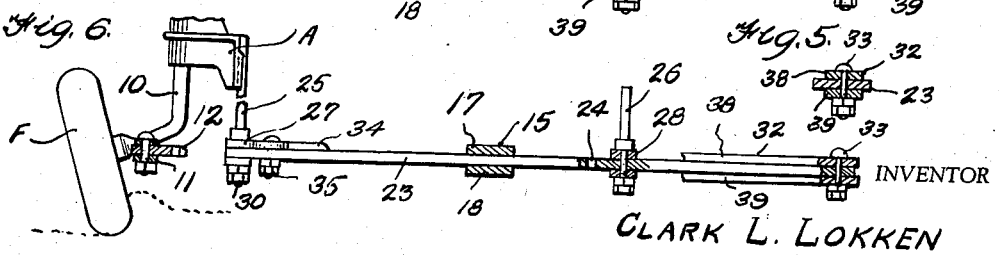
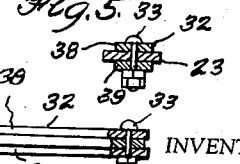
INVENTOR
CLARK L. LOKKEN
BY *Irving A. McCathran*
HIS ATTORNEY

Patented Feb. 16, 1954

2,669,172

UNITED STATES PATENT OFFICE 2,669,172

ONE-WAY DISK TILLER HITCH

Clark L. Lokken, Jamestown, N. Dak.

Application December 30, 1949, Serial No. 136,066

1 Claim. (Cl. 97—180)

This invention relates to a one-way disk tiller hitch, and has for one of its objects the production of a simple and efficient hitch for use with a disk tiller, and is connected to the tiller in a manner to cause the furrow wheel to run in its proper position at all times, even while making curves or turns.

A further object of this invention is the production of a tiller hitch which will pull the tiller parallel to the furrow regardless of the condition of the soil, and will cause the land wheel to run true and parallel to the furrow.

Another object of this invention is the production of a hitch wherein the tractor hitch bar is pivotally connected rearwardly of the forward cross bar to provide a pushing action upon the cross bar, and wherein the tractor hitch bar is adjustably connected to the forward steering bar, which steering bar is connected to the furrow wheel in a manner to cause the furrow wheel to run in its proper position within the furrow and to run parallel to the furrow.

Other objects and advantages of the present invention will appear throughout the following specification and claim.

In the drawing:

Figure 1 is a top plan view of the hitch shown in relation to the frame of a disk tiller, certain parts being shown in dotted lines and the land and front furrow wheels being shown in their relative positions;

Figure 2 is a fragmentary longitudinal sectional view taken on line 2—2 of Figure 1;

Figure 3 is a fragmentary longitudinal sectional view taken on line 3—3 of Figure 1;

Figure 4 is a transverse sectional view taken on line 4—4 of Figure 1;

Figure 5 is a transverse sectional view taken on line 5—5 of Figure 1;

Figure 6 is an irregular sectional view taken on line 6—6 of Figure 1.

By referring to the drawing in detail it will be seen that A designates the frame of a disk tiller, and this frame may be of the conventional or any form of disk tiller. I do not desire to limit my invention to any specific disk tiller, since the present hitch may be used to attach any tiller to a tractor or other draft means, without departing from the spirit of the invention. A land wheel L and a front furrow wheel F are supported in a suitable manner upon the frame A. The front furrow wheel F is supported in the conventional manner upon a suitable front furrow axle 10 which is preferably provided with a forwardly extending steering bar engaging arm 11. The arm 11 is pivotally secured to a steering bar 12 by means of a bolt or other securing means 13 which passes through one of the selected adjusting apertures 14 which are aligned longitudinally of the steering bar 12, the aperture 14 at the end of the bar being shown as being so engaged in Figure 1.

A tractor hitch bar or draft bar 15 is pivotally secured to the steering bar 12 by means of a bolt or other securing means 16, which passes through the bar 15 and through one of the selected apertures 14 formed in the bar 12. In the present illustration, the pin 16 passes through the fifth aperture 14 from the opposite end of the bar 12, with respect to the end engaging the pin 13. The draft bar 15 preferably comprises a pair of spaced strap members 17 and 18 having suitable spacers 19, 20, 21 and 22. The steering bar 12 extends transversely between the strap members 17 and 18, as shown in Figure 1.

A transversely extending cross bar 23 also extends through the draft bar 15 between the strap members 17 and 18, and is located in spaced relation rearwardly of the steering bar 12. The cross bar 23 is provided with a series of longitudinally aligned adjusting apertures 24 throughout its length. A pair of hitch support bars 25 and 26 which are suitably suspended from the disk tiller frame A carry link elements 27 and 28 respectively. These link elements are secured to the support bars by suitable horizontal pivoting elements such as the elements 29. The link element 27 is secured to one end of the cross bar 23 by means of a bolt or other securing element 30 which preferably passes through the aperture 24 adjacent said end of the cross bar 23, as shown in Figure 1. The other link element 28 is secured to the cross bar 23 by means of a bolt or other securing element 31 which passes through the eighth aperture 24 located inwardly from the opposite end of the cross bar 23.

A rearwardly inclined draft bar connecting member 32 is pivotally connected to the outer end of the cross bar 23 opposite the connection 30 by means of a bolt or other element 33, the bolt 33 engaging the aperture at the outer extremity of the cross bar 23. The connecting member 32 is braced by means of a bracing bar 34 which is secured to the cross member 23 adjacent the connection 30 by means of a suitable bolt or element 35. The bracing bar 34 and the connecting member 32 converge rearwardly of the cross bar 23. The bracing bar 34 is provided with a plurality of longitudinally aligned adjusting apertures 36 at its outer rear end for selectively receiving the connecting bolt or element 37 which is carried by the connecting member 32. The connecting member 32 preferably comprises upper and lower spaced links 38 and 39 between which the bracing bar 34 and the cross bar 35 are fitted, as shown in Figures 4 and 5. The connecting member 32 is provided with a draft bar anchoring end which projects beyond the connecting bolt and is connected to the rear end of the draft bar 15 by means of the bolt 41 in offset relation with respect to the connecting bolt or element 37 which secures the connecting member 32 and bracing bar 34 in converging or V-shaped relation rearwardly of the cross bar 23. A suitable link 42 is pivotally connected to the forward end of the draft bar 15 for connection to a tractor or other draft means.

It should be noted that the converging bracing bar 34 and connecting member 32 may be adjustably connected to the cross bar 23 through the medium of the aligned apertures 24 and the bolts or securing elements. This will permit the device to be adapted to different types of tillers or other implements to be propelled by a pulling medium such as a tractor and the like. The pivotal connection of the hitch or draft bar 15, as at 41, in offset relation with respect to the connection of the bars 34 and 32, as at 37, will produce a pushing force or action upon the cross bar 23 as a pulling action is applied to the hitch or draft bar 15. Since the bar 15 slidably straddles the cross bar 23, this draft bar 15 will be braced against independent upward and downward movement relative to the associated parts of the hitch. At the same time the draft bar 15 may freely swing laterally and slide longitudinally over the cross bar 23 while steering. The front furrow wheel F is connected to the hitch or draft bar by means of the arm 11 and the adjustable steering bar 12, to cause the furrow wheel F to follow the furrow and to change its position as the draft bar 15 is swung. The cross bar 23 is also adjustably attached to the support bars 25 and 26, through the medium of the link elements 27 and 28. It therefore will be seen that the present structure is adjustable to varying conditions and is adaptable for use with various makes of tillers without departing from the spirit of the invention. There also has been produced an adjustable V-push type hitch with an offset connection for the swinging draw or draft bar especially adapted for use upon one-way tillers. The present device has been found to be especially efficient when used with the "John Deere 750 C, 7½ feet heavy duty, power lift disk tiller with 26" disks tilling at depths ranging from four to ten inches."

The present invention provides a structure which facilitates the true pulling of a one-way disk tiller by holding the tiller in a path that is parallel to the furrow, and with the disks of the tiller operating at the desired angle (at soft, medium, or hard ground setting) and with all wheels running true and parallel to the furrow. This will eliminate side draft of the hitch. With the structure herein set forth, it is possible to back up the tiller when necessary, such for instance, to clear the tiller of rocks, straw or other material that causes the tiller to become clogged or plugged up. Due to the manner in which the draft or draw bar 15 is connected to the cross bar 23 and the bracing bar 34 and the member 32, the hitch pulling the tiller will not touch or drag upon the ground at this point of connection.

It should be understood that certain detail changes in mechanical structure may be made without departing from the spirit of the invention so long as these changes fall within the scope of the appended claim.

Having described the invention, what is claimed as new is:

For use with a disk tiller having a frame, a steerable front furrow wheel axle carried by said frame and a forwardly extending steering arm rigidly secured to said axle, a tractor hitch comprising a steering bar adapted to extend transversely across the front of the tiller, means on one end of said steering bar for pivotally securing said steering bar to the steering arm of said tiller, a draft bar comprising a pair of spaced strap members arranged on opposite sides of said steering bar and arranged transversely with respect thereto, spacers interposed between said strap members, a securing element pivotally connecting said draft bar to the other end of said steering bar, a crossbar arranged in substantially parallel spaced relation behind said steering bar and interposed between said pair of strap members, a pair of links arranged contiguous to said crossbar, securing elements connecting said links to said crossbar, means on the rear end of each of said links for securing said links to the tiller frame, a rearwardly inclined connecting member having one end pivotally connected to said crossbar, a bracing bar having one end connected to said crossbar and its other end connected to the rear end of said connecting member, said bracing bar and connecting member converging rearwardly of said crossbar, the rear portion of said bracing bar being provided with a plurality of apertures therein for receiving a securing element whereby the connecting member can be secured at different positions along said bracing bar, said connecting member comprising upper and lower spaced links receiving therebetween said bracing bar and said crossbar, the rear portions of said pair of strap members being offset and connected to the rear end of said connecting member, the connection of the draft bar to the connecting member being in offset relation with respect to the connection of the bracing bar and connecting member whereby a pushing force will be produced upon the crossbar as a pulling action is applied to said draft bar, said draft bar slidably straddling said crossbar whereby the draft bar will be braced against independent upward and downward movement relative to the associated parts of the hitch.

CLARK L. LOKKEN.

References Cited in the file of this patent

UNITED STATES PATENTS

| Number | Name | Date |
| --- | --- | --- |
| 1,029,833 | Thode | June 18, 1912 |
| 1,863,641 | Silver | June 21, 1932 |
| 1,944,674 | Silver | Jan. 23, 1934 |
| 2,256,816 | Scarlett | Sept. 23, 1941 |
| 2,392,903 | Currie | Jan. 15, 1946 |